(12) United States Patent
Jordil et al.

(10) Patent No.: US 9,423,235 B2
(45) Date of Patent: Aug. 23, 2016

(54) DEVICE FOR MEASURING DIMENSIONS OF PARTS

(75) Inventors: Pascal Jordil, Ecoteaux (CH); Bertrand Horchet, Savigny (CH); Serge Mariller, Cheseaux-sur-Lausanne (CH); Pierre Pompili, ST-Germain (CH)

(73) Assignee: TESA SA, Renens (CH)

( * ) Notice: Subject to any disclaimer, the term of this patent is extended or adjusted under 35 U.S.C. 154(b) by 558 days.

(21) Appl. No.: 13/108,806

(22) Filed: May 16, 2011

(65) Prior Publication Data

US 2012/0004886 A1  Jan. 5, 2012

(30) Foreign Application Priority Data

Jul. 2, 2010  (EP) ..................................... 10168374

(51) Int. Cl.
*G06F 15/00* (2006.01)
*G01B 7/287* (2006.01)
*G01B 3/22* (2006.01)
*G06F 15/02* (2006.01)
*G01B 7/34* (2006.01)

(52) U.S. Cl.
CPC ........ *G01B 7/287* (2013.01); *G01B 3/22* (2013.01); *G06F 15/0275* (2013.01); *G01B 7/34* (2013.01); *G01B 2210/58* (2013.01); *G01B 2210/60* (2013.01); *G06F 15/00* (2013.01); *G06F 15/0283* (2013.01)

(58) Field of Classification Search
CPC . G06F 15/00; G06F 15/0275; G06F 15/0283; G01R 1/073; G01R 1/07307; G01R 1/07314; G01R 1/07321; G01B 7/287; G01B 2210/58; G01B 2210/60

USPC ........................ 702/150, 155, 157, 151, 158
See application file for complete search history.

(56) References Cited

U.S. PATENT DOCUMENTS

| | | | |
|---|---|---|---|
| 3,737,856 A | | 6/1973 | Lehrer et al. |
| 4,153,998 A | * | 5/1979 | McMurtry ....................... 33/556 |
| 4,986,004 A | * | 1/1991 | Hartmann et al. ............ 33/555.1 |

(Continued)

FOREIGN PATENT DOCUMENTS

| | | |
|---|---|---|
| EP | 1562020 | 8/2005 |
| JP | H07-29083 A | 1/1995 |

(Continued)

OTHER PUBLICATIONS

Extended European Search Report dated Oct. 29, 2010 issued in European Patent Application No. 10168374.6 (7 pgs.).

*Primary Examiner* — John Breene
*Assistant Examiner* — Lynda Dinh
(74) *Attorney, Agent, or Firm* — Maschoff Brennan (57) ABSTRACT

Measuring system having a plurality of probes for measuring lengths, each probe including a probe tip connected in removable fashion relative to a casing, a transducer supplying an electric signal that is representative of the position of said probe tip relative to the casing, a digital processing unit for sampling the signal from said transducer and transforming it into a digital representation of said position, and a bidirectional interface for a wireless communication network connecting said probes with a control unit. A method including a step during which the clocks of the digital processing units of the probes are synchronized through said bidirectional wireless interface and a step during which the control unit transmits commands determining the instant at which said electric signals are sampled.

20 Claims, 2 Drawing Sheets

(56) References Cited

U.S. PATENT DOCUMENTS

| | | | |
|---|---|---|---|
| 5,068,973 A * | 12/1991 | Yu | 33/549 |
| 5,072,174 A * | 12/1991 | Weber | 324/149 |
| 5,724,745 A * | 3/1998 | Brenner et al. | 33/503 |
| 5,758,431 A * | 6/1998 | Golinelli | 33/572 |
| 5,864,962 A * | 2/1999 | Golinelli | 33/572 |
| 6,301,796 B1 * | 10/2001 | Cresson | 33/556 |
| 6,317,646 B1 * | 11/2001 | de Caussin et al. | 700/173 |
| 6,329,817 B1 * | 12/2001 | Moginine Gummer et al. | 324/251 |
| 6,904,020 B1 * | 6/2005 | Love et al. | 370/252 |
| 7,464,482 B2 * | 12/2008 | Dall'Aglio et al. | 33/555.3 |
| 7,665,219 B2 * | 2/2010 | Styles et al. | 33/503 |
| 8,004,958 B2 * | 8/2011 | Maeda et al. | 369/126 |
| 2001/0017590 A1 * | 8/2001 | Fuge et al. | 340/870.01 |
| 2002/0148130 A1 * | 10/2002 | Ohtsuka | 33/552 |
| 2003/0141881 A1 * | 7/2003 | Mallory | 324/658 |
| 2003/0174666 A1 * | 9/2003 | Wallace et al. | 370/324 |
| 2004/0103548 A1 * | 6/2004 | Jordil | G01B 7/008 33/504 |
| 2004/0212521 A1 * | 10/2004 | Teraguchi et al. | 341/50 |
| 2006/0077902 A1 * | 4/2006 | Kannan et al. | 370/250 |
| 2006/0215614 A1 * | 9/2006 | Woollett | G01B 21/047 370/335 |
| 2007/0063871 A1 * | 3/2007 | Engel et al. | 340/870.07 |
| 2007/0067113 A1 * | 3/2007 | Engel et al. | 702/33 |
| 2007/0291605 A1 * | 12/2007 | Maeda | 369/47.15 |
| 2008/0228441 A1 * | 9/2008 | Lugtenburg | 702/167 |
| 2008/0235970 A1 * | 10/2008 | Crampton | 33/503 |
| 2009/0049704 A1 * | 2/2009 | Styles | G01B 5/012 33/503 |
| 2009/0051938 A1 * | 2/2009 | Miousset et al. | 356/625 |
| 2009/0122008 A1 * | 5/2009 | Melkis et al. | 345/157 |
| 2009/0235547 A1 * | 9/2009 | Hellier | 33/503 |
| 2010/0018069 A1 * | 1/2010 | Ould et al. | 33/503 |
| 2010/0039391 A1 * | 2/2010 | Spink et al. | 345/173 |
| 2010/0205816 A1 * | 8/2010 | Wu et al. | 33/503 |
| 2010/0255788 A1 * | 10/2010 | Saidi et al. | 455/67.11 |
| 2011/0176429 A1 * | 7/2011 | Johnsson et al. | 370/241 |
| 2012/0062246 A1 * | 3/2012 | Tan et al. | 324/662 |
| 2012/0122480 A1 * | 5/2012 | Scalisi | G01C 21/165 455/456.1 |
| 2013/0027716 A1 * | 1/2013 | Melkis et al. | 356/614 |

FOREIGN PATENT DOCUMENTS

| | | |
|---|---|---|
| JP | 2000-266626 A | 9/2000 |
| WO | 2005/109166 | 11/2005 |
| WO | 2007/028964 A1 | 3/2007 |
| WO | 2008/049171 | 5/2008 |

* cited by examiner

DEVICE FOR MEASURING DIMENSIONS OF PARTS

REFERENCE DATA

The present application claims priority of European patent application EP10168374.6 filed on Jul. 2, 2010, the contents whereof are hereby incorporated by reference in their entirety.

TECHNICAL FIELD

The present invention relates to a system of sensors for measuring displacements. Embodiments of the present invention relate in particular to a multiple measuring system for measuring relative dimensions organized around a wireless communication network interfaced by a programming and monitoring system or by a data generation system that controls said measuring system by means of embedded clocks.

BACKGROUND ART

Measuring systems allowing several dimensions of a part to be measured simultaneously are known. These devices, also known by the designation multipoint measuring systems, are typically used in operations of quality control and dimensional verification of finished parts, in particular machined parts, but not only of parts obtained through automatic machining.

These systems generally comprise a system for positioning the part to be measured and the positioning of the measuring elements. Furthermore, they often include stops for positioning the mobile parts in a repeatable way in order to measure a part placed in the system. There are generally carriages or mobile elements supporting comparators or probes for one-dimensional measurements that come into contact at the same time at several predetermined points of the part. The probes, by means of high-precision transducers, supply an electric measuring signal which is transmitted to an external electronic interface that controls the probe, then the results are generally sent to a computer system that allows the parameters to be analyzed and computed and dimensional statistics of values such as thickness, diameter, perpendicularity, conicity, parallelism, excentricity etc. to be performed.

The known multipoint measuring devices use both length probes with a sliding probe tip as well as lever probes with a pivoting probe tip, according to necessity and the configuration of the parts to be measured. Transducers are most often transducers of an inductive type, such as for example LVDT (Linear Variable Differential Transformer) or inductive half-bridges, and typically supply measurements with a precision on the order of 1 μm in a measurement range of several millimeters. Due to space requirements, the electronics are often external to the transducer.

Document WO2005109166 describes a measuring probe having a sliding probe tip for measuring the surface of a mechanical part. An inductive transducer comprised in the probe makes it possible to convert the displacement of the probe's mobile part into an electric signal that is then transmitted to a display device or an external computer. The communication towards the computer takes place through a USB or wireless interface.

One disadvantage of known probes is that each must be connected to an external measuring electronics that transforms the analog data coming from the inductive sensor and transforms and transmits them to a monitoring system. In the case of wireless probes, the measurements are triggered by a measurement trigger signal and the measurements are then stamped with the time of the measurement, as the systems have variable delays. Each measurement element can thus have a measurement delay which causes errors that are difficult to correct. It is difficult to guarantee the synchronization of the transfers of the different elements when it is not known what they are doing neither at the instant of the measurement nor at the moment when the results are sent. Furthermore, these systems rest on asynchronous transmission protocols between when the measurement is triggered and the measurement is recovered, which makes the transmission in these systems complicated, slow and renders the data not always comparable. Finally, these systems can be caused to receive useless information at the time of measurement, which can cause delays in the processing.

BRIEF SUMMARY OF THE INVENTION

One aim of the present invention is to propose a measuring system for measuring the variation in dimensions that can be used as multipoint measuring device, free from the limitations of the known devices and systems. According to the invention, these aims are achieved notably by means of the object of the main claim.

This solution has notably the advantage over the prior art to enable communication to be simplified and the measurement of a considerable number of probes to be effected simultaneously. The probes are autonomous at the instant of the measurement and do not perform other operations that could disrupt the measurement. This advantage over the prior art makes it possible to limit the consumption and perturbations and guarantees the punctuality, quality and accuracy of the measurement.

Knowing the exact instant of the measurement is very important. This invention allows the instant at which the measurement must be performed to be programmed accurately. The latter is sent by means of the wireless network to all the relevant probes so that at the instant of measurement, the probes are free to perform the measurement only. By means of an embedded clock synchronized with that of the main transmitter, the probes perform the measurement at the programmed instant and return sequentially, randomly or preferably in a determined order the result of the measurement by way of a wireless transmission to the main transmitter that can then transmit them to a monitoring station and for example then control a part sorting system.

The probes are also provided with other measuring means that make it possible to take into account environmental disturbances at the time of the measurement, for example temperature probes for correcting the errors caused by thermal dilatations or force sensors for measuring the contact force with the part to be measured or inclination sensors or measuring elements enabling the state of the probe to be qualified, for example the charge level of a battery, the quality of the radio signal or any other environmental parameter.

BRIEF DESCRIPTION OF THE FIGURES

Examples of embodiments of the invention are indicated in the description illustrated by the attached figures wherein.

EXAMPLE(S) OF EMBODIMENTS OF THE INVENTION

Figure 1:
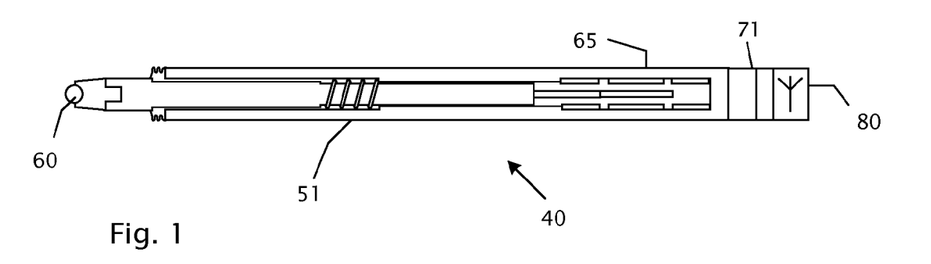
FIG. 1 illustrates very diagrammatically a length probe according to one aspect of the present invention.

FIG. 1 illustrates an example of a length probe 40 that can be used in the frame of the invention. The probe 40 comprises a probe tip 60, for example a sphere of hard metal whose diameter is perfectly known, at the extremity of a rod 62 sliding inside a cylindrical casing 51. A bearing, not represented, or another suitable linear guiding device, enables the accurate axial sliding of the rod 62 and a perfectly reproducible, preferably rectilinear, movement of the probe tip 60.

The probe 40 comprises a transducer 65 enabling the displacement of the rod 62 and of the probe tip 60 relative to the casing 51 to be measured instantaneously. The transducer 65 can be an inductive transducer, for example a linear differential transformer (LVDT—Linear Variable Differential Transformer) or an inductive half-bridge (HBT—Half Bridge Transformer) supplying an analog signal in AC whose amplitude depends in a known manner on the displacement of the probe tip 60. The invention can also include one or several transducers with technology that is for example, though not limited to, optical, magnetic, piezoelectric, capacitive or ultrasonic, extensometers comprising strain gauges, a proximity or contact detector or also accelerometers or temperature probes or any combination with one another of several kinds of sensors whose distance information is either raw or entirely or partially processed digitally.

Generally, the transducer enables the position of the probe tip 60 to be measured with a very good reproducibility, for example a reproducibility of 0.4 µm with a measuring range of ±2 mm. Generally, the permissible error in dimensional metrology (MPE, maximum permissible error) increases with the value of the displacement, hence the interest in remaining close to calibrated values in order to be able to use low-stroke probes with a low MPE. LVDT probes are essentially used for high-precision measurements in a low stroke. For measurements in a broader dimension range, other technologies will be used. The inventive system is thus not restricted to inductive LVDT or HBT probes but also covers any transducers enabling accurate dimensional information in a measuring range adapted to the situation to be extracted.

All kinds of distance transducers can be used in this invention. The first step consists in converting the distance information into electric information. The position is measured by the transducer, which essentially returns an analog electric measurement, then this result is processed in order to transform it into digital information that can then be processed to perform a linearization correction according to a function obtained through calibration. Linearization can be performed either by applying mathematical formulas for approaching the transducer's behavior, or by interpolation of a discrete number of calibrated positions or by correspondence tables fully measured and determined with accuracy for each resolution step of the transducer. It is then also possible to perform other corrections linked to environmental sensors that allow variations to be taken into account that influence the measurement at the sensor level or at the level of the measured physical value, such as for example: light beam reflection, temperature rise of the coils, ambient temperature, contact force, earth attraction to mention but a few.

The invention is not restricted only to axial linear displacement probes for measuring dimensions as shown in FIG. 1 but also includes variants, not represented, in which the probe tip is carried by a pivoting rod and the inclination of the probe tip is converted into a measuring signal depending on the displacement measured by an axial or angular transducer.

Optical, capacitive, ultrasonic and all contactless probes also enable the distance to be measured according to the same principle and with the same constraints. The measured electric result is itself also a function of the distance to be measured and very often requires a linearization processing. It is also possible to use proximity detectors, contact detectors to observe less essential dimension values, or force, pressure or vibratory sensors in order to measure in the infinitively small.

In the known technique, these sensors are used in essentially static situations, leaving sufficient time to stabilize electric values and for a sequential acquisition of the stabilized points. An advantage that arises from this invention is the ability to perform these measurements more quickly since the required stability period is reduced at the sample acquisition instant. It is then possible to perform dynamic measurements accurately at measurement instants predetermined accurately without risk of the probes being busy with other tasks at the precise measurement instant.

In the presented invention, the probe 40 comprises a processing and control electronic unit 71 arranged for receiving the electric signal generated by the transducer 65 and transforming it into a digital signal. This unit performs the processing of the electric signal so that it becomes proportional to the displacement distance observed by the transducer, preferably according to a normalized measuring unit such as for example in mV/µm. Preferably, the processing and control unit 71 is arranged to correct, for each kind of transducer, the measurement nonlinearities specific to the transducer 65 relative to the displacement, for example by means of individual calibration databases recorded in a memory unit or of parametric functions relative to the transducer's behavior which requires a computation unit to retrieve a linear measurement value from the electric value.

The probe 40 also comprises a wireless interface 80 (e.g., wireless communication interface) enabling bidirectional data communication. In the example illustrated, the wireless interface 80 and the processing and control unit 71 are contained in the same casing as the probe 40. It is also conceivable, however, for the processing and control unit 71 and/or the wireless interface 80 to constitute one or several external elements interconnected by cable or optic fiber to the probe 40, in order to limit the space requirements at the measurement location.

The wireless interface 80 is constituted of a radio interface enabling communication and exchange of information in a classical wireless local network around IEEE802.11 and IEEE802.15 such as WiFi, ZigBee, Bluetooth, in existing frequency ranges, preferably with several available frequency bands. This system can also adapt to other types of modulation such as GSM or other commercial standards. Communication will be dedicated to this application but will respect the standards in order not to disrupt other uses. This network allows several near devices to be grouped onto a same frequency, with distances between the peripherals of less than 100 meters, preferably of less than 10 meters.

Figure 2:
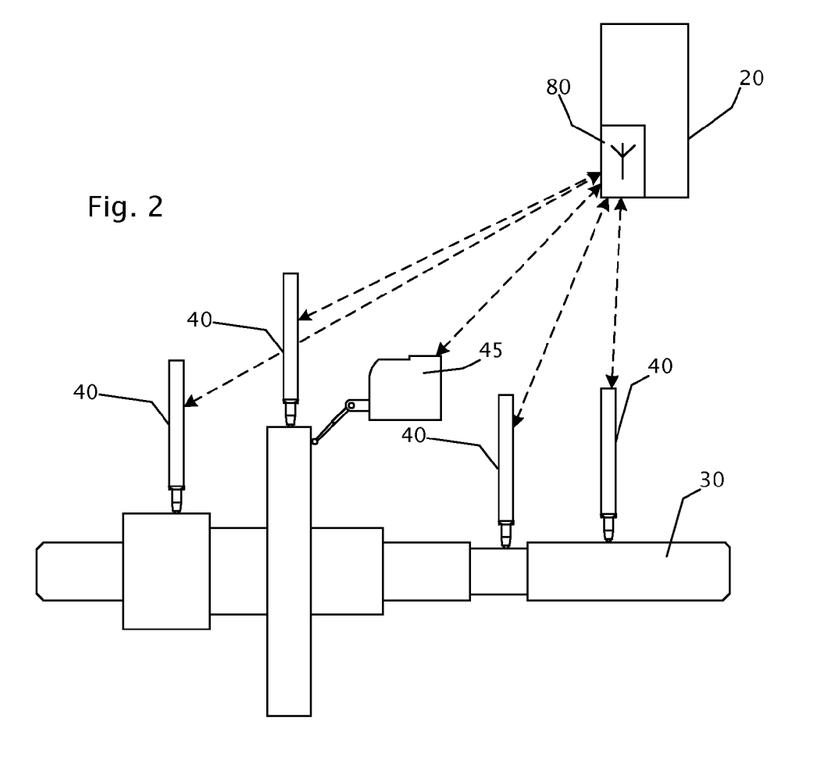
FIG. 2 shows diagrammatically a multipoint measuring device according to one aspect of the invention.

FIG. 2 illustrates an example of a multipoint measuring device according to one embodiment of the invention. The part 30 that is to be measured is held by a positioning system, not represented. A plurality of probes 40, 45 fastened onto one or several rigid mobile supports are brought to the measuring position of the part 30 and take up a position relative thereto. Part after part, the variation of dimension achieved for the same probe configuration comparatively to a known reference part can thus be observed. When the part 30 is a turned part or one that has a rotational symmetry, it is optionally driven in rotation around its axis during the measuring and can thus be measured during the revolution at several time intervals.

The network is organized around a base station 20 that is equipped with a wireless interface 80 (e.g., wireless bidirectional interface and at least one interface for communicating with a monitoring system such as for example a computer. The wireless interface makes it possible to communicate with the interfaces of the probes 40, 45 and receives data from the probes 40, 45, such as for example the measurement result, but also allows the interrogation of other parameters. The simultaneous knowledge of the relative dimensional variations of the points measured by the probes 40, 45 is transmitted to the processing unit which processes them to obtain complex information and combine measurements according to the configurations in order to determine the diameter, thickness and any kind of dimensional parameter that can be computed and used to evaluate errors of perpendicularity, parallelism, concentricity, perpendicularity or conicity and establish statistics taking into account the orientation and the effects of the environment (temperature, vibration, acceleration, constraint) and decide about sorting the parts.

Figure 3:
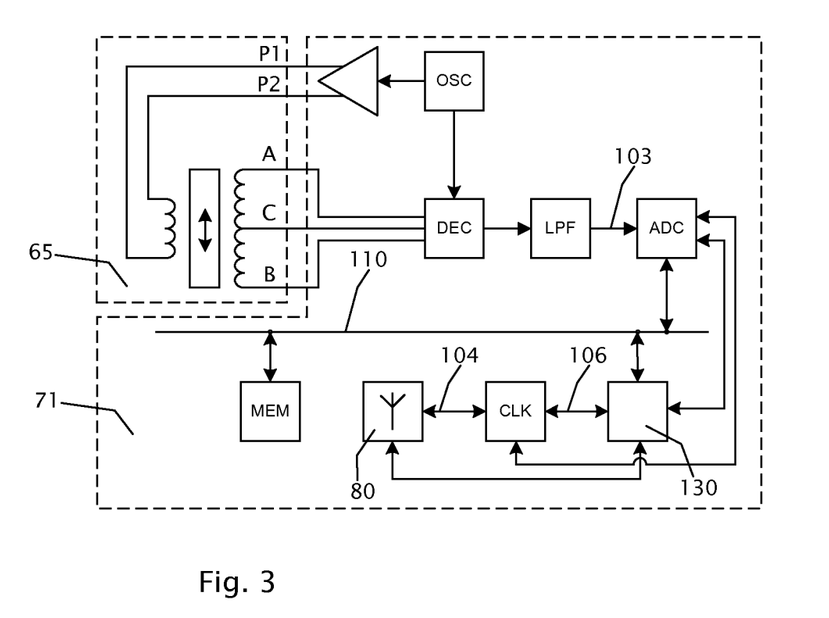
FIG. 3 illustrates a block diagram of a processing unit according to one aspect of the invention.

FIG. 3 illustrates diagrammatically an example of an embodiment, a possible structure of the digital processing and control unit 71. It must, however, be understood that the invention is not limited to this structure and also comprises other variant embodiments that are functionally equivalent to the claimed invention.

An example of inductive transducer 65 is represented in this example as a LVDT sensor. An alternating signal originating from the oscillator OSC is injected into the primary. An analog measuring signal at the terminals A, B, C is thus obtained. This signal is representative of the position of the plunger core and, consequently, of that of the probe tip. A demodulator, by means of the signal sampler 103, transforms the signal into digital information of the dimensional variation of the position of the probe tip. The digital representation is recorded if necessary in the MEM memory by the data bus 110 and is accessible by the processor 130 until it is transmitted to the base station and the central unit.

According to one aspect of the present invention, the processing and control unit 71 also comprises a clock circuit CLK supplying a precise clock signal that serves as time basis for the processing and control unit 71. This time basis can be used to time-stamp information, as is often the case, but also enables, in the frame of this invention, the measurement sampling to be triggered for the programmed instant, it operates as a count-down until the measurement instant. The clock circuit CLK is synchronized with the other clock circuits of the other units forming the wireless network in order to retain synchronicity with the other clock circuits of the other units forming the wireless network within a certain time. Synchronization will occur from time to time or during message exchange, without need for permanent synchronization.

Several clock synchronization mechanisms are possible and included within the frame of the invention. Preferably, synchronization is performed at the level of the network protocol (arrow 104), the clock CLK synchronizes by means of the radio signal of the wireless interface 80. This synchronization message is generally contained at the beginning of the messages transmitted by the main network management unit.

After the step of synchronizing the clocks of the probes 40, 45 visible in FIG. 1, the control unit verifies that the probes 45 are ready to measure and then sends commands to the probes through the wireless network in order to program the measurement instant which will be used for sampling the analog electric signals from the measuring transducer 103.

In a variant embodiment of this invention, the device that concentrates wireless communication and serves as base station makes it possible to organize, synchronize and control the probes and the peripherals. A base station groups the communication from the probes and the peripherals on frequency bands, also called channels, and organizes the probes and peripherals of a channel so as to have structured communications. Each channel can have its own independent communication. A base station works on one of the available channels, the user can program it according to need. The bandwidth of each channel is distributed between each member and the modulation frequency is defined so that the transmission time for each member is sufficient for sending in most cases the whole of the information to be transmitted, for example the measurement result, preferably within a single transmission.

In other functionally equivalent variant embodiments, the invention can use time-division or symbol modulation protocols. The system can thus have transmission channels enabling independent communication between the nodes of the network that do not correspond to distinct frequency bands.

Preferably, the device organizes the peripherals by means of a simple protocol since all the peripherals are near one another, the transmission delays between the nodes comprising the network are thus modest and of comparable size. It is not necessary to perform successive synchronization to adjust the possible delays caused by the propagation times. The main device will thus give the synchronization, furthermore it will be the first to talk to give the measuring commands and programming commands, then, depending on the organization of the peripherals, the latter will respond sequentially one after the other according to a predefined sequence.

According to one aspect of the invention, organizing the peripherals occurs in the following manner: the peripheral has a unique set internal identifier, it will first seek the last known base station on the channel last used and attempt to register. If no base station can be found or its previous reservation is no longer free, it will seek a new base station on a free frequency or channel on which a base station is available that still has possible reservations. It will then proceed accordingly until it finds availability on a base station and receives a serial number in a channel.

The registration process is preferably performed in a time space provided to this effect. Once the channel, the base station and the serial number have been determined, the reservation is allocated to the peripheral for a duration that can be determined or infinite. In case of inactivity during a considerable number of cycles, the allocations can be automatically freed. An absent peripheral can suggest reverting to its allocation or request a new allocation. It is also possible to determine an allocation by permanent programming.

The base station that has no further reservation available notifies this in its messages, which enables the probes to directly address a base station capable of accepting them.

The peripherals then operate under the serial number in the channel allocated until their re-initialization or the re-initialization of the base station. By re-initialization one understands the voluntary act of erasing allocations, in principle the parameters will survive a simple power cut. The allocation of the serial number will thus allow the peripherals to be identified in the wireless communication as this gives them a position in the channel transmission from the synchronization message of the base station. This makes it unnecessary to transmit the peripheral's identifier; though using the identifier remains possible.

Each base station is capable of working on one of the available channels and the user can determine the channel manually by programming or, according to the needs and the environment, seek a free channel with a low ambient noise. The station will then start listening to each channel to determine the best choice depending on the existing stations and the noise measured. Advantageously, the peripherals that operate on battery can operate at lower consumption on channels where the radio signal is less disturbed as the required broadcasting signal will be weaker.

Receiving the measurements or the interrogations transmitted to the probes by the base station can require a receipt message from the base station to return to each peripheral following the validation of the control elements included in the transmissions.

In a variant embodiment of this invention, the monitoring station connects to the base station through the radio network. The base station can consist merely in a portable system such as a portable computer or PDA (personal digital assistant) enabling the state of the systems at the measurement point to be visualized quickly. This allows the operator to adjust dynamically the probes and the active elements before they are put to use. Communication occurs through the base station in the normal operation mode.

The probe and the portable computer can also include a troubleshooting mode with a direct connection to one another, this mode being reserved for adjustments as it does not perform any time synchronization but allows parameters to be programmed, such as for example in respect of the connection to the base station without the peripheral performing automatic searches, and can also allow reprogramming (firmware) or parameterization (dump) to be carried out in order to exchange one probe with another without having to go through all parameterization steps.

The probes are equipped with rechargeable batteries that can also if necessary be exchanged or charged during the measurement. However, in some cases of use, it is helpful if the probes are free from any cables to provide greater freedom and less influence on the positioning. The probes notify the base station in case of battery failure before they are no longer capable of measuring. To this effect, the probes are provided with a battery charge sensor.

The particular peripherals can be programmed specially, just like the base station. Furthermore, the base station can include specific programming modules for peripherals that require interactivity, for example for transmitting commands or executing macros for operations that require an operation to be executed on a powerful or faster unit than that which is available in the peripheral. This category of peripherals includes monitoring stations, triggers and state detectors prior to measuring as well as sorting systems, computing systems for the post-processing of the measurement and the processing and manipulation of the parts measured. All can operate through the wireless network or be connected and controlled by a base station insofar as a specific programming is implemented in the base station. This programming serves to define how they interact with one another, to distinguish for example an emergency stop trigger from a measuring trigger and to whom the result of an operation coming from a peripheral is to be transmitted.

In a variant embodiment of this invention, the probes are put in standby if they do not receive a message during a long period of time, where this duration before standby can be programmed; during standby, the receivers listen to the channel in a less permanent fashion and no longer transmit. To awaken them, it is thus necessary to repeat a start-up message and wait for all of them to be awake before proceeding with a measurement.

In one variant embodiment of the invention, the probe is equipped with a temperature probe to measure the temperature rise of the probe after an extended standby period or during punctual measurements, in order to be able to adapt as well as possible the working conditions to the calibrated linearization characteristics. One could for example decide to perform calibrations at a reduced temperature or, conversely, heat the sensor so that it reaches the reference temperature for the measurement. The sensors' additional parameters can be returned in addition to the measurement to the processing unit or serve as precondition for a measurement or its planning and programming. This is not limited to the temperature sensor but can also relate to an orientation to be reached or a necessary contact force or the measurement of acceleration or the level of vibrations or a limit position that should not be exceeded or an ambient lighting that disturbs the optical measurement as well as all other measurement conditions that can be qualified and that have an influence on the sensor or on the physical value measured by the sensor.

In a variant of the invention, the base station uses a quick programming mode for the peripherals. The base station uses all of the transmitter bandwidths to program simultaneously the peripherals in burst mode instead of using its unique transmitting space time. This method offers the advantage of using up very little time. The probes remain listening for a short period for the command giving and the programming. In this variant embodiment, each bandwidth is used for the data to be transmitted to each peripheral specifically and sends as often as necessary all of the parameters to the probes before carrying out the measurement.

In a variant embodiment of the burst mode, the programming sequences are predefined in advance and are always sent in the same order, as preliminary to a measurement. In this manner, each peripheral receives an identical number of parameters, including empty parameters if necessary. This optimizes the number of transmission cycles necessary to parameterize all the peripherals of the channel. In this mode, each parameter has its own allocated transmission cycle so that each peripheral receives the same type of parameter at the same time. Subsequently, the measuring mode proceeds in the conventional transmission-reception mode.

In a variant embodiment of this invention, the probe can receive parameter programming commands and state interrogation commands. It will mainly receive operating parameters, setting the time synchronization and allowing the internal clock to be programmed, but also tolerance information such as minima and maxima, or other further useful parameters enabling the measurement to be processed fully or partly. This kind of peripheral is capable of being completely programmed remotely in order to add functionalities and process additional internal sensors. It is also capable of integrating more complex computing functions to take into account projection or proportionality angles or to correct positioning errors supplied by other probes or by its own sensors or to be capable of deciding depending on the result of the measurement.

In one embodiment of this invention, the probes receive first the parameter programming. Then they receive a first measurement coming from the positioning probes and which qualifies the measurement setting up system onto the part. If necessary, they receive correction data relative to the positioning and orientation of the measurement support that supports the probes, in order to adapt the result according to these alignment variations. These corrections can be expressed in three dimensions. Finally, they receive the time programming for their measurement. In this variant embodiment, the computing unit can be contained within the probe for simple operations. In the case of complex measurements, the system can resort to a computing unit, such as for example a monitoring station, to perform heavier geometric computing operations when there are many probes in particular arrangements, in which case the probe receives as a parameter the corrections to be applied that are adapted to its own measuring reference frame.

In a variant embodiment of this invention, the probes are capable of measuring and self-adapting according to orientation and positioning parameters. This is achieved by means of additional sensors such as for example accelerometers, pressure sensors, vibration sensors, temperature probes capable of supplying information qualifying the conditions and operating point of the sensor and making it possible to deduce the most exact possible result during the punctual measurement, inasmuch as it is comparable to that of the measurement in ideal conditions, free from any influence and perfectly stabilized. Then, depending on the corrections of orientation, disturbances and operating point, an adapted and corrected measurement value is returned.

Sensors are also found that enable the position of the fitting systems to be taken into account, which allows the measurement of several probes to be corrected by detecting the variations in orientation which influence the measurement from each probe. A computing unit can be made to calculate the corrections, but it is also conceivable for positioning probes to transmit these parameters prior to the measurement so that the probes that measure the part to be measured take this into account when establishing the measurement result in order to take into account their specific orientation. It is also observed that this type of embodiment requires the knowledge of the probes' orientation in order to know in which direction to correct the positioning or to analyze a variation with opposing probes.

In a variant embodiment of this invention, the probe can yield a simple result or one that is combined with another result, for example in the case of opposing or parallel probes or probes distributed in a regular geometry in order to obtain a synthetic tolerance result on one dimension, requiring the results to be cumulated or differentiated, or it can send a status of several peripherals after several pieces of information have been processed.

In a variant embodiment of this invention, the probes also comprise orientation sensors, for example accelerometers and/or local gravity force sensors, enabling the direction of the obtained measurement to be oriented precisely and a vectorial value, for example a vectorial length, to be returned.

In a variant embodiment of this invention, the monitoring system can serve as an aid to the user to position and/or orient the probes in optimum working ranges in order to obtain a quality measurement in a range whose variation is quantifiable and calibrated with increased accuracy and minimum entropy. It is for example possible to parameterize a set temperature rise for a LVDT sensor and calibrate it in these specific conditions to avoid complex formulas with several parameters. Entropy is minimized on the maximum of possible parameters.

The system also allows the probe's stroke to be positioned so that the useful run is placed optimally relative to the situation to be measured and especially so that all the probes that are conjointly measuring are placed in measuring conditions that are as similar to one another as possible and far from the probes' end of stroke. By taking good care of these nonlinearity aspects, the global measurement error can be reduced.

The monitoring system performs precisely this service by enabling the probe's measuring range to be visualized and positioned relative to its stroke and the type of transducer used and relative to the part to be measured and the expected measurement variation.

In this configuration, one may wish to reset to zero the measured value in the reference position in order to observe only the variations when the parts are measured. The system is advantageously capable of supplying this option allowing the measurement range to be programmed with a static delay value. This value can be the value of a real reference point to which one adds the variation or the value allowing the variation of dimension relative to the reference part to be isolated.

In a variant embodiment of the invention, the probes are organized around a central transmitter-receiver system capable of transmitting the measuring commands, these same measuring commands coming from portable triggers, capable of working on a communication channel, and a set of probes being capable of receiving the measuring command and of performing the measurement after a predefined programmed lapse of time. Then, depending on the tolerances programmed in the probes, the latter return a good or bad status to sorting elements, all being governed by a wireless network of wireless peripherals, of the point-to-point type, around a simplified base station that does not require a permanent monitoring station.

In this embodiment, the probes and peripherals require preliminary programming to determine the measurement, synchronization and serialization parameters in a radio channel. Then, depending on each result from each probe sequentially, a sorting collection system receives from a base station these states and performs the necessary sorting. The sorting station can also conceivably be included in a base station.

In one embodiment, state indicators will be used, in the form of trigger probes or position measurements designed to validate the position and orientation of the mobile elements supporting the probes when they are brought into position for the measurement. The system will also make it possible to detect the absence of parts and possible errors of the system as well as the remedy adapted to each situation (handling error, collisions, emergency stops etc.) and also prevent erroneous measurements from being sent.

In a variant embodiment of this invention, it is possible to fasten the probes on a fitting at the end of an articulated arm or of a robot. The articulate arm then positions the fitting to perform high-precision measurements relative to different points of a part to be tested. In this case, the absence of wires on the probes is of great interest. The probe would also be conceivable in machine tools, instead of a tool, to be loaded in a machine to perform a measurement in a production cycle.

In another variant embodiment of this invention, the probes are programmed to know the minimum and maximum as well as the orientation of the measurement in order to then return tolerance information to a sorting system. The advantage of such a system is to offer a modular solution capable of doing without wires and requiring little material.

REFERENCE NUMBERS USED IN THE FIGURES

40 probe with axial displacement
45 probe with pivoting arm
51 casing
60 probe tip
65 transducer
71 processing and control unit
80 wireless interface 20 base station
30 part to be measured
110 data bus
103 electric signal
130 processor
104 synchronization signal
106 synchronization signal

The invention claimed is:

1. A probe system for acquiring variations in dimension at several points of a workpiece simultaneously, the system comprising:
   a control unit comprising a processor and a memory, and wireless communication network interface; and
   a plurality of position measuring probes, each position measuring probe including:
      a probe tip;
      a transducer configured to measure length, wherein the transducer supplies an analog electric signal that is representative of the variation in a distance between the probe tip and an observed part;
      an analog to digital converter configured to sample the analog electric signal and configured to transform the analog electric signal into a digital signal proportional to the variation in the distance between the probe tip and an observed part, wherein the digital signal is a digital representation of the variation in the distance between the probe tip and an observed part;
      a wireless network communication interface configured to communicate with a wireless communication network connecting the position measuring probe with the control unit, wherein the wireless network communication interface is bidirectional, and
      a processing unit having an embedded clock and configured to control the analog to digital converter and the wireless network communication interface, wherein the embedded clock is synchronized through the wireless network communication interface with the control unit and other probes of the plurality of position measuring probes,
      wherein the control unit is configured to specify an instant of measurement when the analog electric signal is to be sampled in response to receiving a command from the wireless network communication interface specifying an instant of measurement, and each of the processing units is configured to sample the analog electric signal at the instant of measurement,
      wherein each of the plurality of position measuring probes sample respective analog electric signals at different points of a workpiece at the instant of measurement.

2. The system of claim 1, wherein the wireless communication network comprises at least one base station that organizes, synchronizes and sends commands to the probes and peripherals participating in the network.

3. The system of claim 1, wherein the bidirectional communication interface transmits measurements of the probes and a programming of measurement parameters.

4. The system of claim 3, wherein the bidirectional communication interface is arranged so as to transfer operating parameters of one probe of the network to another probe of the network.

5. The system of claim 4, wherein the wireless communication network includes one or several portable monitoring systems that configured to connect in a wireless network and arranged so as to interrogate the base station and/or the probes and peripherals.

6. The system of claim 5, wherein the monitoring system is arranged for visualizing a probe's stroke and enabling it to be positioned and oriented relative to the part to be measured.

7. The system of claim 1, wherein each probe of the plurality of position measuring probes is programmed with a time programming that is defined by a time delay of the measurement that is programmed in each probe, the time programming being variable according to each of the probes to perform synchronous or asynchronous measurements.

8. The system of claim 1, wherein the instant of measurement is triggered by a countdown of the embedded clock, the countdown being triggered by a synchronization radio signal and a trigger command.

9. The system of claim 8, wherein a frequency and power of a radio signal are optimized relative to ambient noise so as to limit the probes' electric consumption for transmitting on the wireless network.

10. The system of claim 1, wherein the probes perform a series of measurements at time intervals defined by programming.

11. The system of claim 1, wherein the probes are also provided with other measurement means configured to measure environmental disturbances at a moment of the measurement.

12. The system of claim 1, wherein the probes also comprise orientation sensors and are adapted to supply vectorial measurements.

13. The system of claim 1, wherein the control unit is configured to determine and transmit tolerance information depending on a programmed tolerance limit.

14. The system of claim 1, wherein the probe system further comprises a trigger switch or push-button arranged for generating a measurement programming command.

15. The system of claim 1, wherein the control unit is configured to control sorting systems through the wireless network.

16. The system of claim 1, wherein the control unit is configured to check a state of peripherals before programming a measurement.

17. The system of claim 1, wherein the control unit is configured to control compute at least one variation of one of the following values: diameter, thickness, perpendicularity, parallelism, concentricity, orthogonality and conicity.

18. A method of measuring dimensions of a mechanical part simultaneously by a plurality of position measuring probes, each measuring probe having a transducer supplying an analog electric signal that is representative of a distance between the probe and the mechanical part, and a wireless network communication interface for a wireless communication network connecting each of the plurality of position measuring probes with a control unit, and a processing unit comprising an embedded clock; the method comprising:
   supplying by the transducer an analog signal that represents a variation in a distance between a probe tip and an observed part;
   transforming the analog signal into a digital signal that represents the variation in the distance between the probe tip and an observed part using an analog to digital converter;
   synchronizing the embedded clock via the wireless network interface with other probes of the plurality of probe devices;
   receiving a command from the control unit via the wireless network communication interface specifying an instant of measurement when the analog electric signal is to be sampled by the measuring probe;

at the instant of measurement sampling the analog electric signal with the measuring probe;

transforming the analog signal into a digital signal via the analog to digital converter; and transmitting the digital signal to the control unit through the wireless network communication interface.

19. The method of claim 18, in which the position measuring probes are programmed to take simultaneous measurements.

20. A probe system for acquiring variations in dimension, the system comprising:

a control unit comprising a processor, a memory and a wireless communication network interface;

a plurality of position measuring probes comprising:

a transducer supplying an analog electric signal that is representative of a variation in a distance between a probe and an observed part;

an analog to digital converter configured to sample the analog electric signal and configured to transform the analog electric signal into a digital signal proportional to the variation in the distance between the probe tip and an observed part;

a wireless network communication interface configured to provide communication with the control unit via the wireless communication network interface of the control unit; and a processing unit having an embedded clock, the processing unit is configured to:

control the analog to digital converter and the wireless network communication interface, receive a command from the control unit via the wireless network communication interface specifying an instant of measurement when the analog electric signal is to be sampled, and sample the analog electric signal at an instant of measurement, wherein each of the plurality of position measuring probes sample respective analog electric signals at the instant of measurement, wherein the embedded clock is synchronized through the wireless network communication interface with the control unit and other probes of the plurality of position measuring probes, wherein the processing unit is configured to transmit the digital signal to the control unit via the wireless network communication interface, and wherein the processing unit is configured to communicate programming of measurement parameters via the wireless network communication interface; and at least one base station that organizes, synchronizes and sends commands to the plurality of position measuring probes, wherein the system is arranged so as to transfer operating parameters of one probe of the network to another probe of the network.

* * * * *